(12) United States Patent
Chen et al.

(10) Patent No.: US 9,966,864 B2
(45) Date of Patent: May 8, 2018

(54) ELECTRONIC APPARATUS AND CONTROL METHOD OF ELECTRONIC APPARATUS

(71) Applicant: DELTA ELECTRONICS, INC., Taoyuan (TW)

(72) Inventors: Tie Chen, Taoyuan (TW); Jun-Lai Huang, Taoyuan (TW); Hui Huang, Taoyuan (TW); Yun-Peng Dong, Taoyuan (TW); Lei Cai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 137 days.

(21) Appl. No.: 14/941,687

(22) Filed: Nov. 16, 2015

(65) Prior Publication Data

US 2016/0172988 A1    Jun. 16, 2016

(30) Foreign Application Priority Data

Dec. 15, 2014    (CN) .......................... 2014 1 0776958

(51) Int. Cl.
*H02M 3/335* (2006.01)
*H02M 1/36* (2007.01)
*H02M 1/00* (2006.01)

(52) U.S. Cl.
CPC ......... *H02M 3/33546* (2013.01); *H02M 1/36* (2013.01); *H02M 3/335* (2013.01); *H02M 2001/0058* (2013.01); *Y02B 70/1433* (2013.01)

(58) Field of Classification Search
CPC .... H02M 1/36; H02M 3/335; H02M 3/33546; H02M 2001/0058; Y02B 70/1433
See application file for complete search history.

(56) References Cited

U.S. PATENT DOCUMENTS

| 4,937,728 | A | | 6/1990 | Leonardi | |
|---|---|---|---|---|---|
| 5,917,313 | A | * | 6/1999 | Callahan, Jr. | ........... H02M 1/36 323/288 |
| 8,093,878 | B2 | | 1/2012 | Goto et al. | |
| 8,391,026 | B2 | | 3/2013 | Santoro et al. | |
| 9,647,528 | B2 | * | 5/2017 | Lee | .......................... H02M 1/32 |

(Continued)

FOREIGN PATENT DOCUMENTS

| CN | 101127484 A | 2/2008 |
|---|---|---|
| CN | 101335485 A | 12/2008 |

(Continued)

*Primary Examiner* — Fred E Finch, III
*Assistant Examiner* — Rafael O De Leon Domenech
(74) *Attorney, Agent, or Firm* — CKC & Partners Co., Ltd.

(57) ABSTRACT

An electronic apparatus includes a converting circuit and a first control circuit. The converting circuit converts an input voltage to an output voltage. The first control circuit compares a feedback signal representing the output voltage with a target voltage to generate an error voltage. When the electronic apparatus is on a starting-up status and the error voltage is not greater than a threshold voltage, the first control circuit outputs a first driving signal to drive the converting circuit according to the error voltage. When the electronic apparatus is on a starting-up status and the error voltage is greater than the threshold voltage, the first control circuit stops outputting the first driving signal. A frequency of the first driving signal is determined according to the error voltage.

18 Claims, 12 Drawing Sheets

(56) References Cited

U.S. PATENT DOCUMENTS

| | | | | |
|---|---|---|---|---|
| 2013/0229829 A1* | 9/2013 | Zhang | ............... | H02M 3/33546 |
| | | | | 363/16 |
| 2015/0103564 A1* | 4/2015 | Duan | ................... | H02M 3/285 |
| | | | | 363/21.02 |
| 2015/0109830 A1* | 4/2015 | Xu | .................... | H02M 3/33569 |
| | | | | 363/21.03 |
| 2015/0229220 A1* | 8/2015 | Lee | ........................ | H02M 1/32 |
| | | | | 363/21.03 |
| 2016/0099639 A1* | 4/2016 | Leisten | ............... | H02M 3/3376 |
| | | | | 323/271 |

FOREIGN PATENT DOCUMENTS

| | | |
|---|---|---|
| CN | 101340150 A | 1/2009 |
| CN | 101527989 A | 9/2009 |
| CN | 102545603 A | 7/2012 |
| CN | 103138550 A | 6/2013 |
| CN | 103296892 A | 9/2013 |
| CN | 203445600 U | 2/2014 |
| CN | 103683944 A | 3/2014 |
| TW | 200937157 A | 9/2009 |
| TW | 201230629 A | 7/2012 |
| TW | I368122 B | 7/2012 |
| TW | 201330473 A | 7/2013 |
| TW | I436540 B | 5/2014 |

\* cited by examiner

ELECTRONIC APPARATUS AND CONTROL METHOD OF ELECTRONIC APPARATUS

RELATED APPLICATIONS

This application claims priority to Chinese Patent Application No. 201410776958.X, filed on Dec. 15, 2014, which is herein incorporated by reference.

BACKGROUND

Field of Disclosure

The disclosure relates to an electronic apparatus and a control method thereof.

Description of Related Art

A resonant circuit is a main application for an electronic apparatus. The conventional resonant circuit adopts both pulse-frequency modulation (PFM) and pulse-width modulation (PWM) for soft-start control. However, such soft-start control may result in loss and more voltage stress of the switching elements in the resonant circuit when the electronic apparatus works. On the other hand, the conventional control method of the electronic apparatus adopts a phase shift of an output rectifier circuit. However, the conventional control method is only applicable to the output rectifier circuit with synchronous rectification, but can not be applied to diode rectifier circuits, causing limited applications. Further, the conventional control method may result in higher voltage stress of the switching element. Moreover, the conventional control method requires additional circuits to meet high power density requirements, causing the cost of electronic apparatus greatly increased.

Therefore, there is a need for an electronic apparatus and its control method that achieves soft-start control with monotonic performance and lower complexity, lower cost and smaller size.

SUMMARY

One aspect of the disclosure is to provide an electronic apparatus, which includes a converting circuit and a first control circuit. The converting circuit converts an input voltage to an output voltage. The first control circuit is electrically connected to the converting circuit. The first control circuit compares a feedback signal representing the output voltage with a target voltage to generate an error voltage. The first control circuit outputs a first driving signal to drive the converting circuit according to the error voltage when the electronic apparatus is on a starting-up status and the error voltage is not greater than a threshold voltage. The first control circuit stops outputting the first driving signal when the electronic apparatus is on a starting-up status and the error voltage is greater than the threshold voltage, in which a frequency of the first driving signal is determined according to the error voltage.

Another aspect of the disclosure is to provide a control method of an electronic apparatus, which includes the following steps: generating a feedback signal according to an output voltage outputted by a converting circuit of the electronic apparatus; comparing the feedback signal with a target voltage to generate an error voltage; outputting a first driving signal to drive the converting circuit according to the error voltage when the electronic apparatus is on a starting-up status and the error voltage is not greater than a threshold voltage; and stopping outputting the first driving signal when the electronic apparatus is on the starting-up status and the error voltage is greater than the threshold voltage, in which a frequency of the first driving signal is determined according to the error voltage.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Connected" and "coupled" may still be used to indicate that two or more elements cooperate or interact with each other.

As used in the description herein and throughout the claims that follow, the meaning of "a", "an", and "the" includes reference to the plural unless the context clearly dictates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Figure 1:
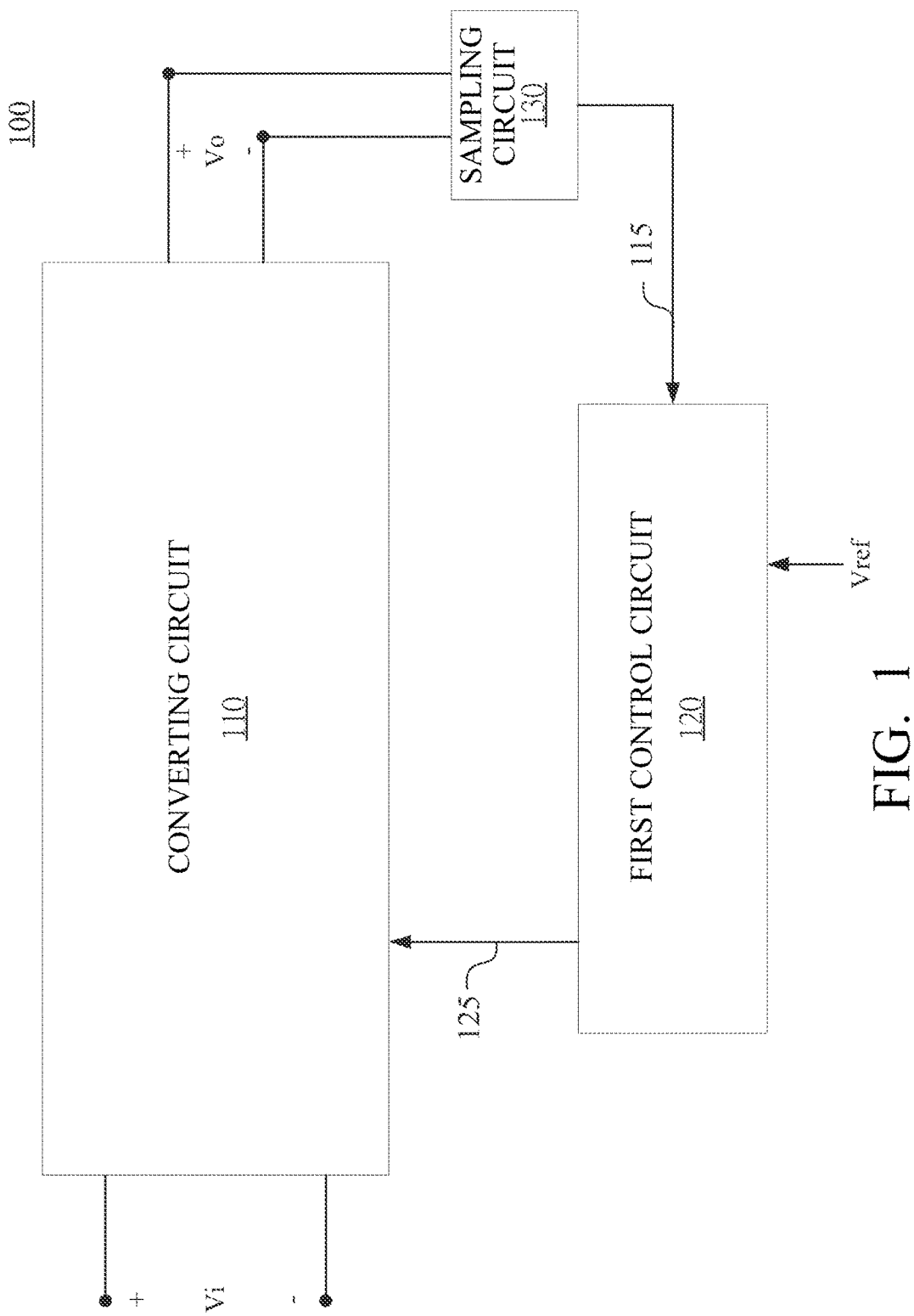
FIG. 1 is a schematic block diagram of an electronic apparatus in accordance with one embodiment of the disclosure.

Referring to FIG. 1, FIG. 1 is a schematic block diagram of an electronic apparatus 100 in accordance with one embodiment of the disclosure. The electronic apparatus 100 may be a power supply, but is not limited thereto. The electronic apparatus 100 includes a converting circuit 110 and a first control circuit 120. In one embodiment, the electronic apparatus 100 further selectively includes a sampling circuit 130.

The converting circuit 110 converts an input voltage Vi to an output voltage Vo. In one embodiment, the converting circuit 110 may be but not limited to a resonant converting circuit.

The first control circuit 120 is electrically connected to the converting circuit 110 and the sampling circuit 130. The first control circuit 120 compares a feedback signal 115 representing the output voltage Vo with a target voltage Vref to generate an error voltage (e.g., the error voltage 215 shown in FIG. 2). In one embodiment, the target voltage Vref has a dynamically increased voltage value as illustrated in FIG. 3. The target voltage Vref has a lower voltage value when the electronic apparatus 100 starts. Then, the target voltage Vref continues to increase to a higher constant voltage value, such that the output voltage Vo outputted by the converting circuit 110 eventually reaches a set output value along with the change of the target voltage Vref.

In the embodiment, when the electronic apparatus 100 is on a starting-up status (for example, during a soft-start period that the output voltage Vo outputted by the converting circuit 110 does not yet reach the set output value) and the error voltage is not greater than a threshold voltage, the first control circuit 120 is further configured to output a first driving signal 125 to drive the converting circuit 110 according to the error voltage. When the electronic apparatus 100 is on the starting-up status and the error voltage is greater than the threshold voltage, the first control circuit 120 stops outputting the first driving signal 125. The frequency of the first driving signal 125 is determined according to the error voltage.

In one embodiment, when the electronic apparatus 100 is on an operating status followed after the starting-up status, the first control circuit 120 is further configured to output the first driving signal 125 to drive the converting circuit 110 according to the error voltage. For example, after the electronic apparatus 100 starts, when the output voltage Vo outputted by the converting circuit 110 has reached the set output value, the first control circuit 120 still keeps outputting the first driving signal 125 to drive the converting circuit 110.

The sampling circuit 130 generates the feedback signal 115 according to the output voltage Vo. In one embodiment, the sampling circuit 130 may be but not limited to a differential amplifier.

Figure 2:
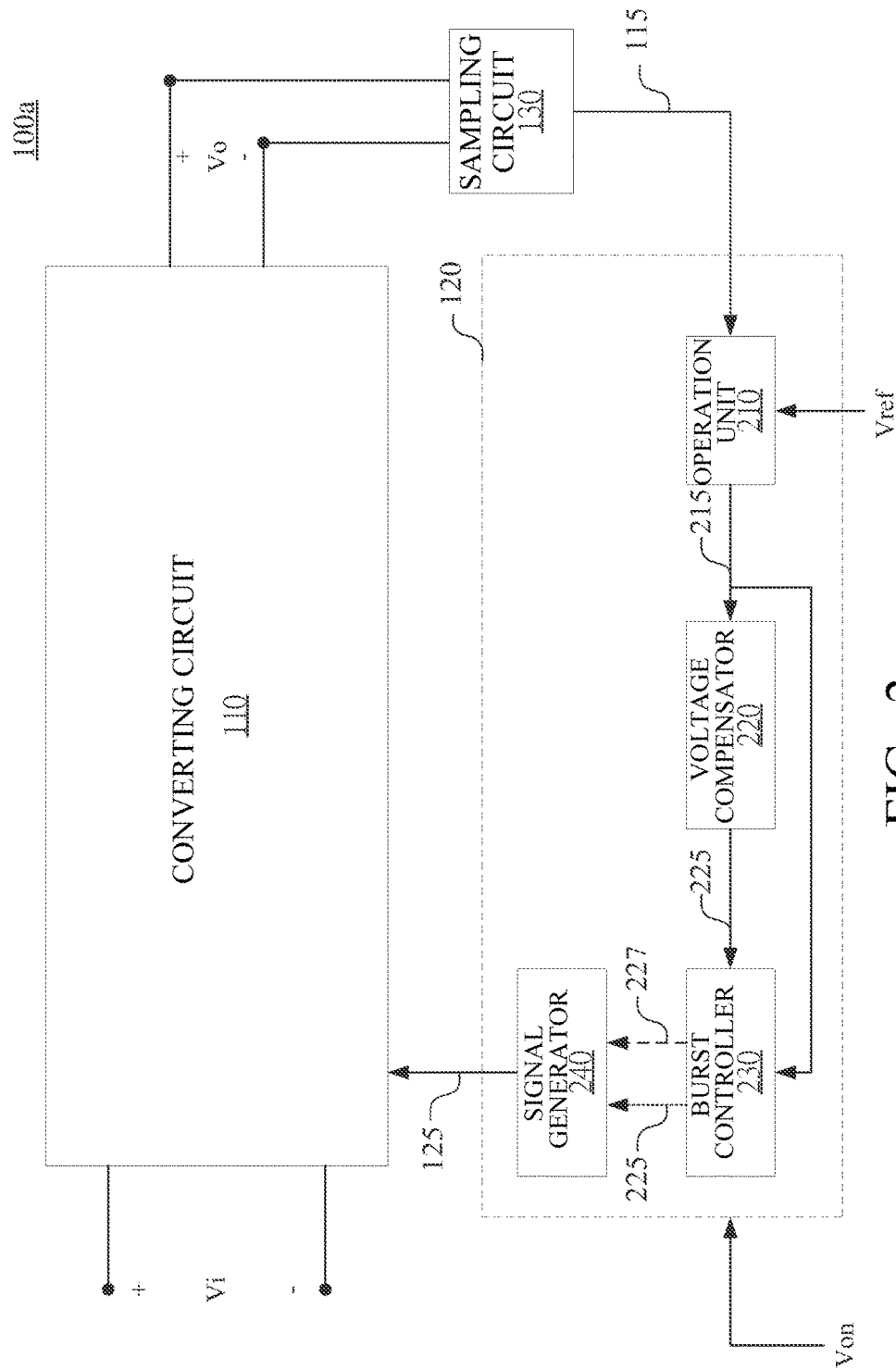
FIG. 2 is a schematic block diagram of an electronic apparatus in accordance with one embodiment of the disclosure.
Figure 3:
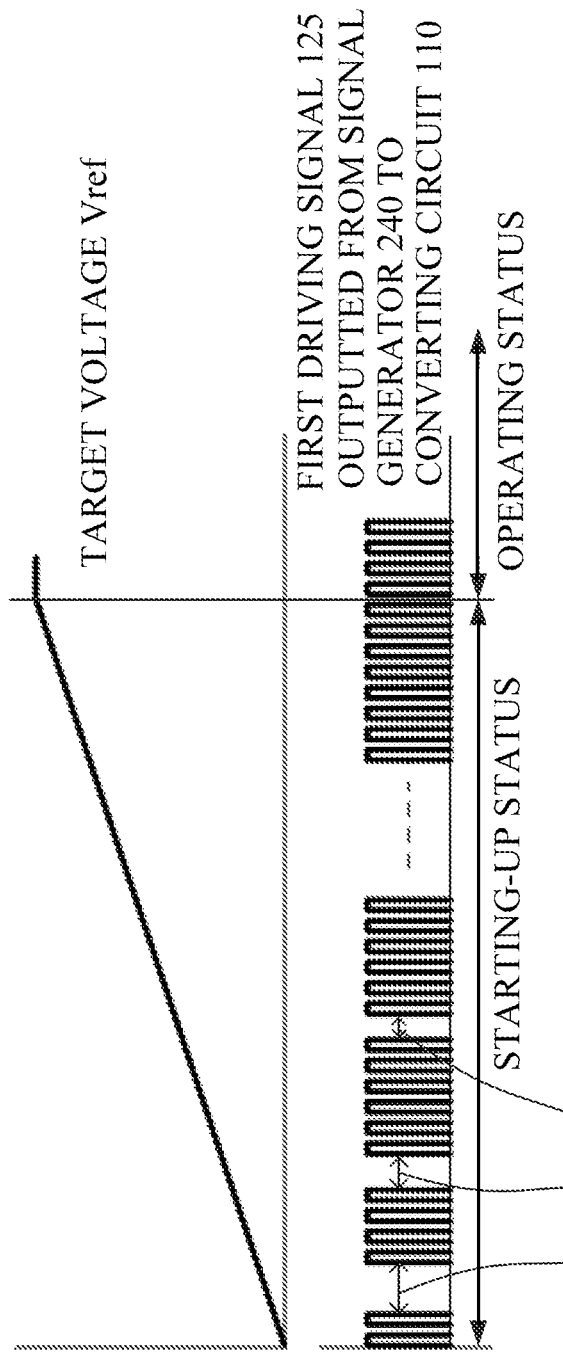
FIG. 3 is a signal waveform diagram of an electronic apparatus in accordance with one embodiment of the disclosure.

The configuration and operation of the first control circuit 120 will be further described in the embodiment shown in FIG. 2.

Referring to FIG. 2, FIG. 2 is a schematic block diagram of an electronic apparatus 100a in accordance with one embodiment of the disclosure. In comparison with the embodiment shown in FIG. 1, the first control circuit 120 includes a voltage compensator 220, a burst controller 230 and a signal generator 240. In one embodiment, the first control circuit 120 further selectively includes an operation unit 210. The operation unit 210 subtracts the target voltage Vref from the voltage corresponding to the feedback signal 115 to generate the error voltage 215. The operation unit 210 may be but not limited to a subtractor. In one embodiment, the voltage value Ve of the error voltage 215 is determined from the following equation:

$$Ve = K \times (Vfbk - Vref),$$

where Vfbk is the voltage value of the feedback signal 115 and K is a constant.

In another embodiment, the first control circuit 120 further selectively includes an analog-to-digital converter (ADC). The ADC converts the feedback signal 115 to a digital feedback signal, such that the operation unit 210 subtracts the digital signal corresponding to the target voltage Vref from the voltage corresponding to the digital feedback signal to generate the error voltage 215.

The voltage compensator 220 generates a first adjustment signal 225 according to the error voltage 215. In one embodiment, the voltage compensator 220 includes an integrator, a differentiator, a proportional-integral controller, a proportional-derivative controller or a proportional-integral-derivative controller.

The burst controller 230 is electrically connected to the voltage compensator 220. The burst controller 230 receives the first adjustment signal 225, and to output the first adjustment signal 225 when the electronic apparatus 100a is on the starting-up status and the error voltage 215 is not greater than the threshold voltage.

In one embodiment, the first control circuit 120 determines that the electronic apparatus 100a enters a starting-up status (or a soft-start status) according to a starting-up enable signal Von generated by the electronic apparatus 100a. In another embodiment, the first control circuit 120 determines that the electronic apparatus 100a exits the starting-up status when the difference between the feedback signal 115 and a constant voltage is smaller than a numerical value. The constant voltage may be artificially set depending on various circuits and various requirements, and the numerical value may be such as 1% of the constant voltage.

The signal generator 240 is electrically connected to the burst controller 230. When the burst controller 230 outputs the first adjustment signal 225, the signal generator 240 receives the first adjustment signal 225, and to output the first driving signal 125 according to the first adjustment signal 225, and the signal generator 240 may adjust the frequency of the first driving signal 125. In one embodiment, the signal generator 240 includes a pulse-width modulator, and the first driving signal 125 is a pulse-width modulation (PWM) signal. In another embodiment, the first adjustment signal 225 includes first frequency information, and the signal generator 240 compares the first adjustment signal 225 including the first frequency information with the triangular wave or the sawtooth wave in the signal generator 240 to output the first driving signal 125 with the first frequency information. The first driving signal 125 may be but not limited to a pulse wave. The comparison may be implemented by using an analog circuit, and may also be implemented by using a digital method (for example, by a software method).

Accordingly, the voltage compensator 220 generates the first adjustment signal 225 with the first frequency information according to the error voltage 215, and the signal generator 240 adjusts the frequency of the first driving signal 125 according to the first adjustment signal 225 when the signal generator 240 receives the first adjustment signal 225. So the frequency of the first driving signal 125 is determined according to the error voltage 215.

In one embodiment, when the electronic apparatus 100a is on the starting-up status and the error voltage 215 is not greater than the threshold voltage, the signal generator 240 receives the first adjustment signal 225, and outputs the first driving signal 125 to drive the converting circuit 110 according to the first adjustment signal 225.

In another embodiment, when the electronic apparatus 100a is on the starting-up status and the error voltage 215 is greater than the threshold voltage, the burst controller 230 is further configured to output a second adjustment signal 227 to the signal generator 240, such that the signal generator 240 stops outputting the first driving signal 125 according to the second adjustment signal 227.

In yet another embodiment, when the electronic apparatus 100a is on an operating status followed after the starting-up status, the signal generator 240 is further configured to output the first driving signal 125 to drive the converting circuit 110 according to the first adjustment signal 225.

Please also refer to FIG. 3. FIG. 3 illustrates signal waveforms of the target voltage Vref and the first driving signal 125 outputted from the signal generator 240 in accordance with one embodiment of the disclosure.

In the embodiment shown in FIG. 3, when the electronic apparatus 100a is on the starting-up status, the target voltage Vref continues to increase from a lower voltage value to a higher constant voltage value. During the starting-up status period, when the error voltage 215 is not greater than the threshold voltage, the signal generator 240 outputs the first driving signal 125 to the converting circuit 110. For example, the first driving signal 125 is the rectangular wave signal during the starting-up period as shown in FIG. 3. The signal generator 240 determines the frequency of the rectangular wave signal under the starting-up status according to the first adjustment signal 225 outputted by the burst controller 230.

During the starting-up status, when the error voltage 215 is greater than the threshold voltage in the time period T as shown in FIG. 3, the signal generator 240 stops outputting the first driving signal 125 to the converting circuit 110 according to the second adjustment signal 227.

Further, when the electronic apparatus 100a is on an operating status followed after the starting-up status, the signal generator 240 outputs the first driving signal 125 to drive the converting circuit 110. For example, the first driving signal 125 is the rectangular wave signal during operating period as shown in FIG. 3. In one embodiment, the signal generator 240 also determines the frequency of the rectangular wave signal under the operating status according to the first adjustment signal 225 outputted by the burst controller 230.

As mentioned above, in the embodiments of the disclosure, when the error voltage 215 is greater than the threshold voltage under the starting-up status, the first control circuit 120 stops outputting the first driving signal 125 to the converting circuit 110, but it is not limited thereto. In one embodiment, when the error voltage 215 is greater than the threshold voltage under the starting-up status, the burst controller 230 outputs the first adjustment signal 225 with zero voltage value to the signal generator 240, such that the signal generator 240 outputs a signal with zero voltage value. Consequently, it is equivalent to that the first control circuit 120 stops outputting the first driving signal 125 to the converting circuit 110.

In yet another embodiment, when the error voltage 215 is greater than the threshold voltage under the starting-up status, the burst controller 230 outputs a particular signal to a control end of the signal generator 240. Thereby, the input end of the signal generator 240 receives a signal with zero voltage value, such that the signal generator 240 stops outputting the first driving signal 125 to the converting circuit 110.

In yet another embodiment, the burst controller 230 may determine whether to enable the signal generator 240. In the embodiment, when the error voltage 215 is greater than the threshold voltage under the starting-up status, the burst controller 230 does not enable the signal generator 240. Accordingly, the signal generator 240 stops outputting the first driving signal 125 to the converting circuit 110.

In yet another embodiment, there is a switch circuit disposed between the signal generator 240 and the converting circuit 110. The switch circuit may control the connection between the signal generator 240 and the converting circuit 110, so as to control whether the first driving signal 125 is transmitted to the converting circuit 110. In the embodiment, when the error voltage 215 is greater than the threshold voltage under the starting-up status, the first control circuit 120 controls the switch circuit to disconnect the signal generator 240 from the converting circuit 110. Consequently, it is equivalent to that the first control circuit 120 stops outputting the first driving signal 125 to the converting circuit 110.

Figure 4:
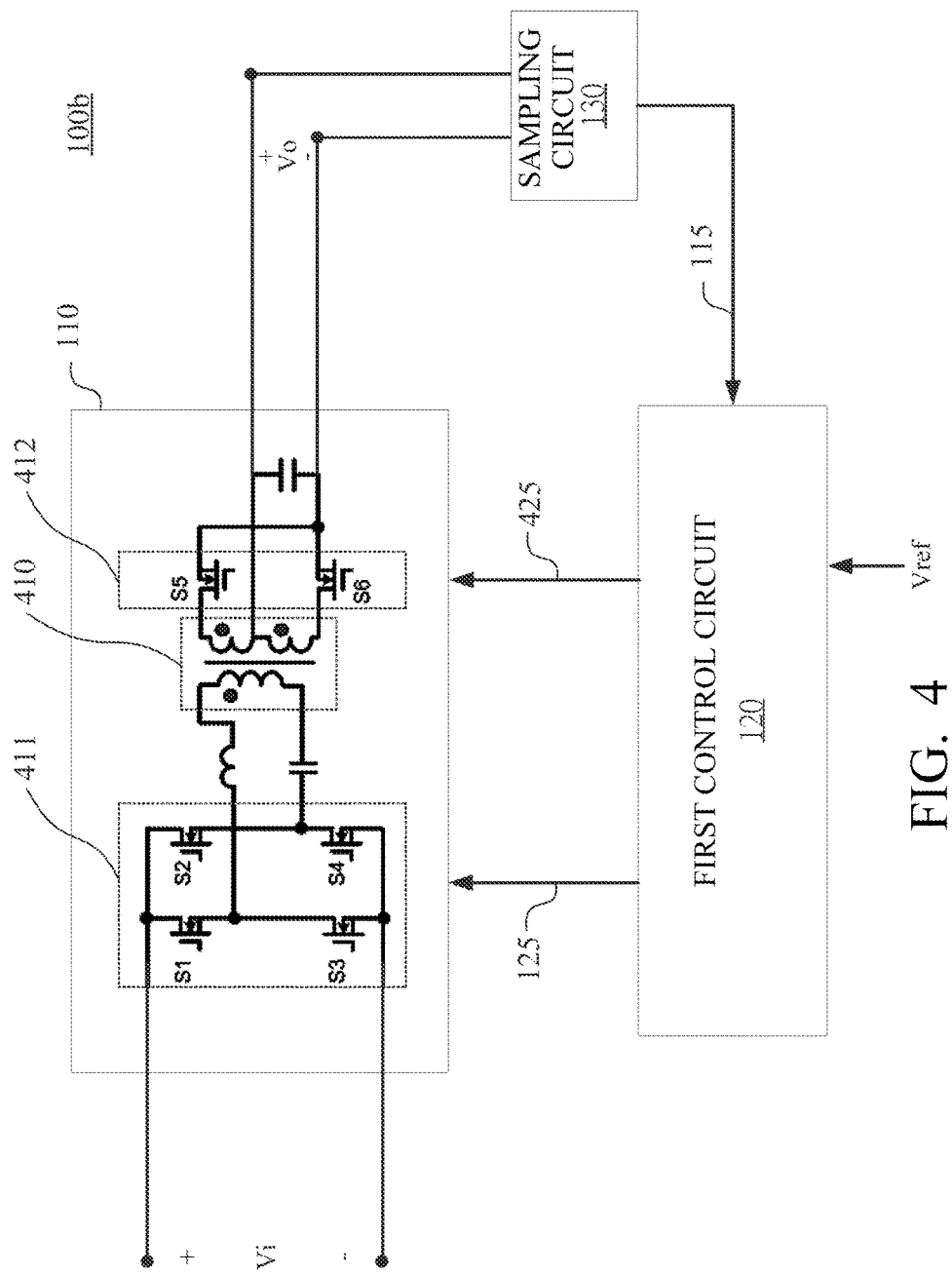
FIG. 4 is a schematic block diagram of an electronic apparatus in accordance with one embodiment of the disclosure.

Please refer to FIG. 4, FIG. 4 is a schematic block of an electronic apparatus 100b in accordance with one embodiment of the disclosure. In the disclosure, the converting circuit 110 includes a transformer 410, a first switch module 411 and a second switch module 412. The first switch module 411 is disposed at a first side (i.e. primary side) of the transformer 410, and the second switch module 412 is disposed at a second side (i.e. secondary side) of the transformer 410.

In one embodiment, the first driving signal 125 is used for driving the first switch module 411. When the electronic apparatus 100b is on the starting-up status and the error voltage is not greater than the threshold voltage, the first control circuit 120 is further configured to output a second driving signal 425 to drive the second switch module 412 according to the error voltage. When the electronic apparatus 100b is on the starting-up status and the error voltage is greater than the threshold voltage, the first control circuit 120 stops outputting the second driving signal 425.

In one embodiment, the first switch module 411 includes first switching elements S1, S2, S3 and S4. The second switch module 412 includes second switching elements S5 and S6. The first driving signal 125 is used for controlling on/off of the first switching elements S1, S2, S3 and S4, and the second driving signal 425 is used for controlling on/off of the second switching elements S5 and S6. In one embodiment, the first switching elements S1 and S4 are turned on/off simultaneously, the first switching elements S2 and S3 are turned on/off simultaneously, and the first switching element S1/S4 and S2/S3 are complementarily turned on/off. In another embodiment, the second switching elements S5 and S6 are complementarily turned on/off.

In one embodiment, the frequency of the second driving signal 425 is determined according to the error voltage (for example, the error voltage 215 shown in FIG. 2). The operation of the first control circuit 120 adjusting the frequency of the second driving signal 425 according to the error voltage may be similar to that of the first control circuit 120 adjusting the frequency of the first driving signal 125 according to the error voltage in the embodiment as shown in FIG. 2, but is not limited thereto. In one embodiment, the signal generator 240 compares the first adjustment signal 225 including second frequency information with the triangular wave or the sawtooth wave in the signal generator 240, so as to output the second driving signal 425 including the second frequency information.

The voltage compensator 220 generates the first adjustment signal 225 with the second frequency information according to the error voltage 215, and when the signal generator 240 receives the first adjustment signal 225, the signal generator 240 adjusts the frequency of the second driving signal 425 according to the first adjustment signal 225. Therefore, the frequency of the second driving signal 425 is determined according to the error voltage 215.

In another embodiment, when the electronic apparatus 100b is on an operating status followed after the starting-up status, the first control circuit 120 is also configured to output the second driving signal 425 to drive the second side 412 of the transformer 410 according to the error voltage.

The operation related to that of the first control circuit 120 outputting and stopping outputting the second driving signal 425 may be similar to that of the first control circuit 120 outputting and stopping outputting the first driving signal 125 in the embodiment shown in FIG. 2, but is not limited thereto, and the description is not repeated herein.

Figure 5:
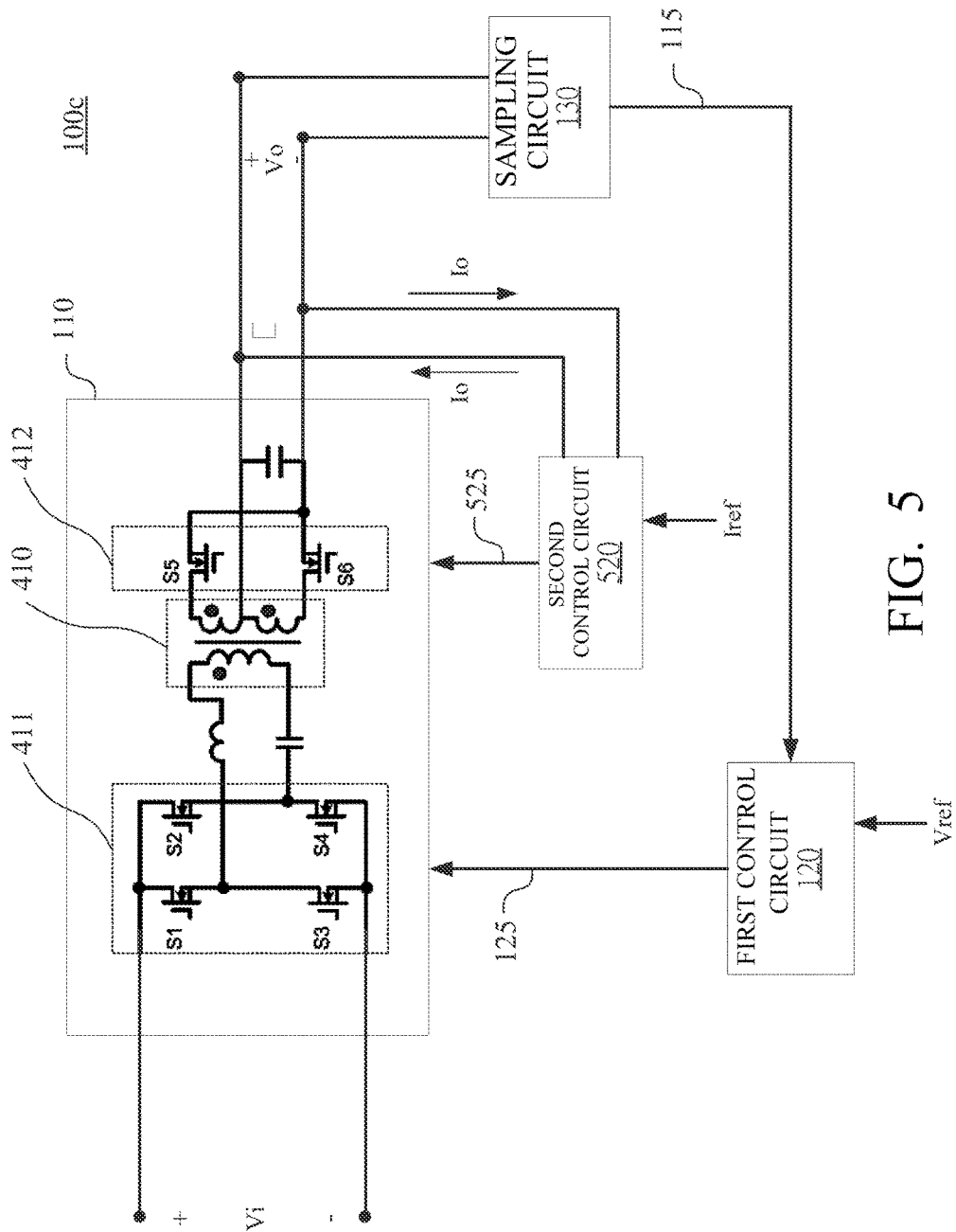
FIG. 5 is a schematic block diagram of an electronic apparatus in accordance with one embodiment of the disclosure.

Please refer to FIG. 5, FIG. 5 is a schematic block of an electronic apparatus 100c in accordance with one embodiment of the disclosure. Similar to the embodiment shown in FIG. 4, the converting circuit 110 shown in FIG. 5 includes the transformer 410, the first switch module 411 and the second switch module 412. The first switch module 411 is disposed at a first side (i.e. primary side) of the transformer 410, and the second switch module 412 is disposed at a second side (i.e. secondary side) the transformer 410.

In comparison with the embodiment shown in FIG. 1, the electronic apparatus 100c of the embodiment shown in FIG. 5 further includes a second control circuit 520. The second control circuit 520 is electrically connected to the converting circuit 110.

The second control circuit 520 compares at least one output current Io outputted by the converting circuit 110 with a target current Iref to generate a comparison result. When the electronic apparatus 100c is on the starting-up status, the second control circuit 520 selectively outputs a second driving signal 525 to drive the second side 412 of the transformer 410 according to the comparison result. In one embodiment, when the electronic apparatus 100c is on the starting-up status and the comparison result is smaller than a threshold value, the second control circuit 520 outputs the second driving signal 525 to drive the second side 412 of the transformer 410. In another embodiment, when the electronic apparatus 100c is on an operating status followed after the starting-up status, the second control circuit 520 outputs the second driving signal 525 to drive the second side 412 of the transformer 410. The operation of the foregoing comparison and determining whether to output the second driving signal 525 may be implemented by hardware (for example, a comparator and a chip), and may be implemented by software. Further, the internal structure of the second control circuit 520 may be similar to that of the first control circuit 120, but is not limited thereto, and the description is not repeated herein.

In the embodiment, the converting circuit 110 includes the structure shown in FIG. 5, but is not limited thereto. The converting circuit 110 may be at least a resonant circuit. For example, the first switch module 411 may be a half-bridge or bridgeless structure; the second switch module 412 may be a full-bridge rectifier structure; the transformer 410 may be multiple transformers, and the first side and the second side of the transformers may be a multilink structure of series connection in combination with parallel connection; and the resonant method may also be various circuit modes such as series resonant, parallel resonant or LLC.

Figure 6:
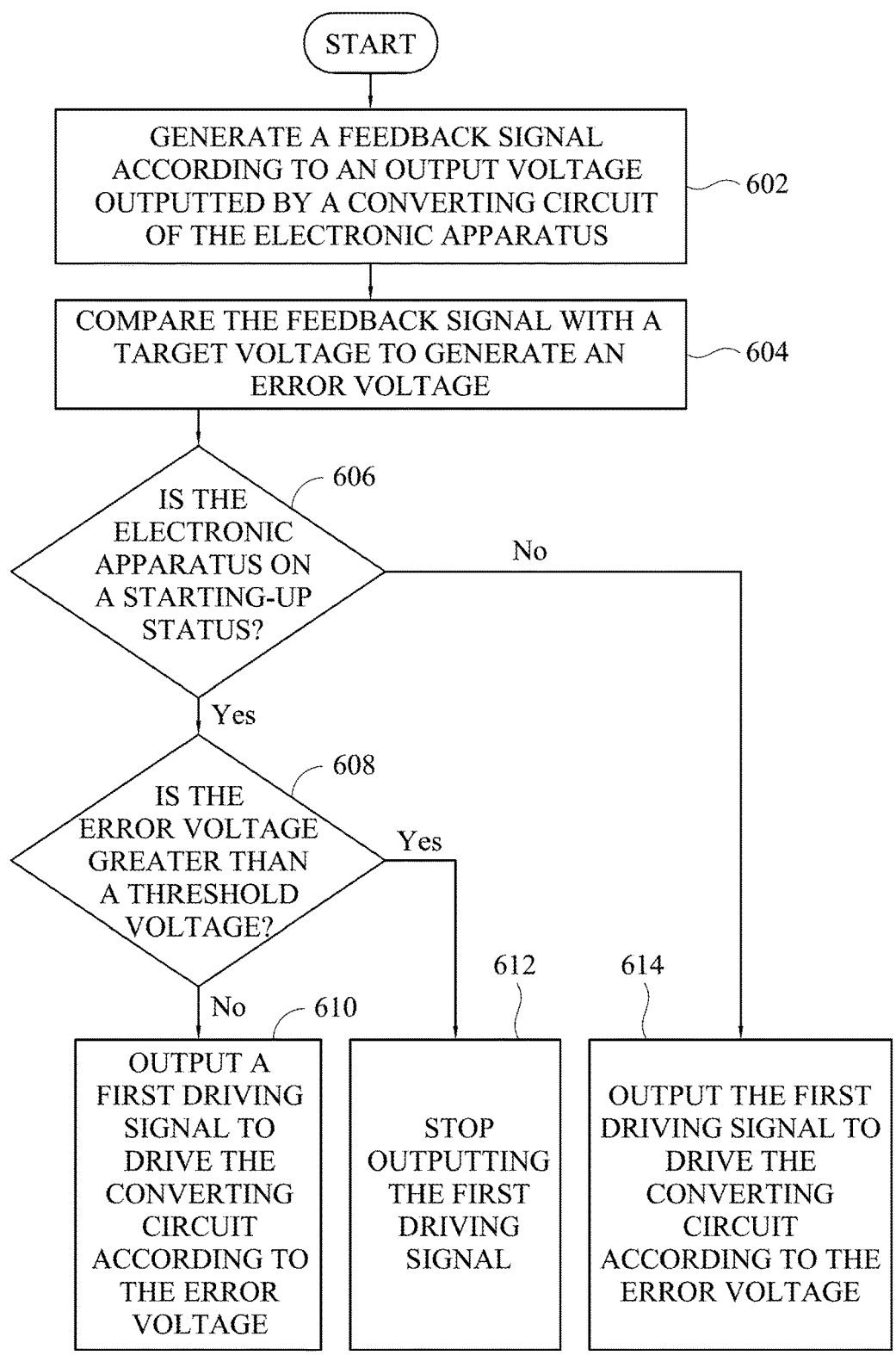
FIG. 6 illustrates a schematic flow chart of a control method of an electronic apparatus in accordance with one embodiment of the disclosure.

Please refer to FIG. 6, FIG. 6 illustrates a schematic flow chart of a control method of an electronic apparatus in accordance with one embodiment of the disclosure. The control method of the electronic apparatus may be applied to the electronic apparatus shown in FIGS. 1-5, but is not limited thereto. For convenient and clear illustration, the control method of the electronic apparatus described below is illustrated in conjunction with the electronic apparatus 100 shown in FIG. 1.

At step 602, the sampling circuit 130 generates a feedback signal 115 according to an output voltage Vo outputted by a converting circuit 110 of the electronic apparatus 100. In one embodiment, the converting circuit 110 is a resonant converting circuit.

At step 604, the first control circuit 120 compares the feedback signal 115 with a target voltage Vref to generate an error voltage. In one embodiment, the first control circuit 120 subtracts the target voltage Vref from the feedback signal 115 to generate the error voltage.

At step 606, the first control circuit 120 determines whether the electronic apparatus 100 is on a starting-up status. In one embodiment, the first control circuit 120 determines that the electronic apparatus 100 enters the starting-up status according to a starting-up enable signal (e.g., the starting-up enable signal Von shown in FIG. 2) generated by the electronic apparatus 100. Further, the first control circuit 120 determines that the electronic apparatus 100 exits the starting-up status when the difference between the feedback signal 115 and a constant voltage is smaller than a numerical value.

At step 608, the first control circuit 120 determines whether the error voltage is greater than a threshold voltage.

When the electronic apparatus 100 is on the starting-up status and the error voltage is not greater than the threshold voltage, at step 610, the first control circuit 120 outputs a first driving signal 125 to drive the converting circuit 110 according to the error voltage. In the embodiment, the frequency of the first driving signal 125 is determined according to the error voltage.

When the electronic apparatus 100 is on the starting-up status and the error voltage is greater than the threshold voltage, at step 612, the first control circuit 120 stops outputting the first driving signal 125.

Figure 7:
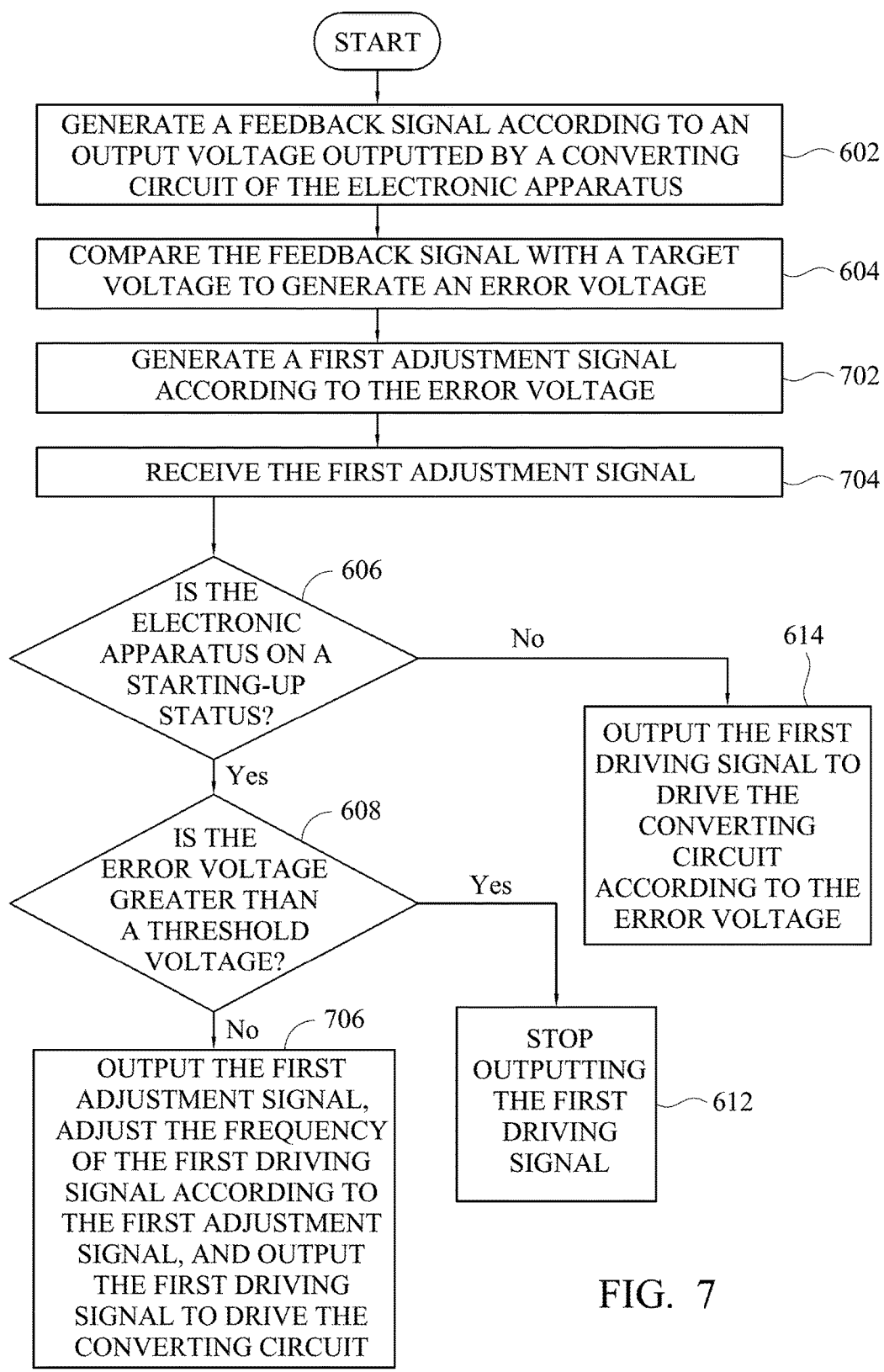
FIG. 7 illustrates a schematic flow chart of a control method of an electronic apparatus in accordance with one embodiment of the disclosure.

At step 614, when the electronic apparatus 100 is on the operating status followed after the starting-up status, the first control circuit 120 outputs the first driving signal 125 to drive the converting circuit 110 according to the error voltage Please refer to FIG. 7, FIG. 7 illustrates a schematic flow chart of a control method of an electronic apparatus in accordance with one embodiment of the disclosure. In comparison with the control method of the electronic apparatus shown in FIG. 6, the control method of the electronic apparatus shown in FIG. 7 further includes step 702, step 704 and step 706. The control method of the electronic apparatus may be applied to the electronic apparatus 100a shown in FIG. 2, but is not limited thereto. For convenient and clear illustration, the control method of the electronic apparatus described below is illustrated in conjunction with the electronic apparatus 100a shown in FIG. 2.

At step 702, the voltage compensator 220 generates a first adjustment signal 225 according to the error voltage 215.

At step 704, the burst controller 230 receives the first adjustment signal 225.

At step 706, when the electronic apparatus 100a is on the starting-up status and the error voltage is not greater than the threshold voltage, the burst controller 230 outputs the first adjustment signal 225, such that the signal generator 240 adjusts the frequency of the first driving signal 125 according to the first adjustment signal 225, and outputs the first driving signal 125 to drive the converting circuit 110.

Figure 8:
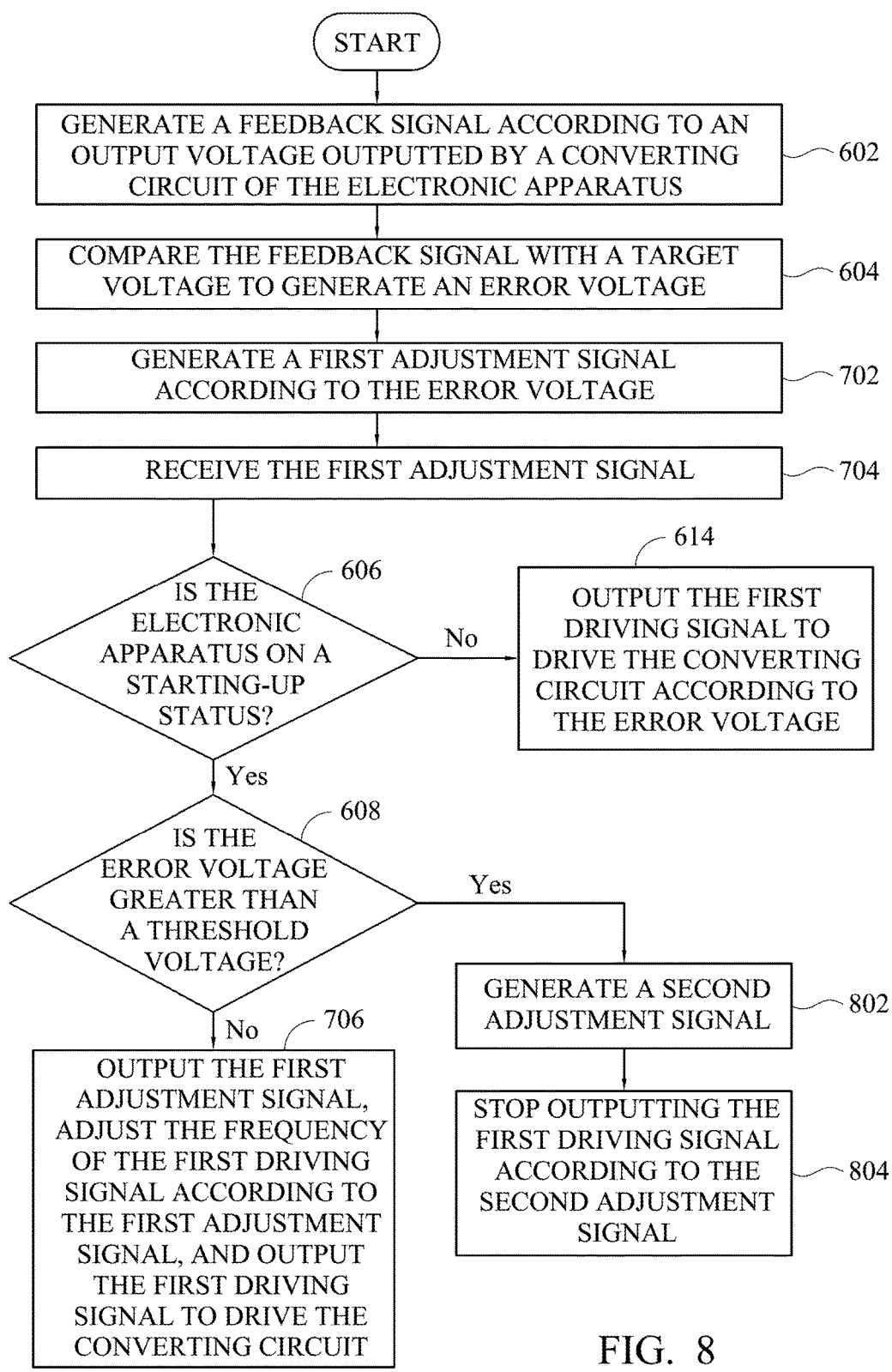
FIG. 8 illustrates a schematic flow chart of a control method of an electronic apparatus in accordance with one embodiment of the disclosure.

Please refer to FIG. 8, FIG. 8 illustrates a schematic flow chart of a control method of an electronic apparatus in accordance with one embodiment of the disclosure. In comparison with the control method of the electronic apparatus shown in FIG. 7, the control method of the electronic apparatus shown in FIG. 8 further includes step 802 and step 804. The control method of the electronic apparatus may be applied to the electronic apparatus 100a shown in FIG. 2, but is not limited thereto. For convenient and clear illustration, the control method of the electronic apparatus described below is illustrated in conjunction with the electronic apparatus 100a shown in FIG. 2.

At step 802, when the electronic apparatus 100a is on the starting-up status and the error voltage is greater than the threshold voltage, the burst controller 230 generates a second adjustment signal 227.

At step 804, the signal generator 240 stops outputting the first driving signal 125 according to the second adjustment signal 227.

Figure 9:
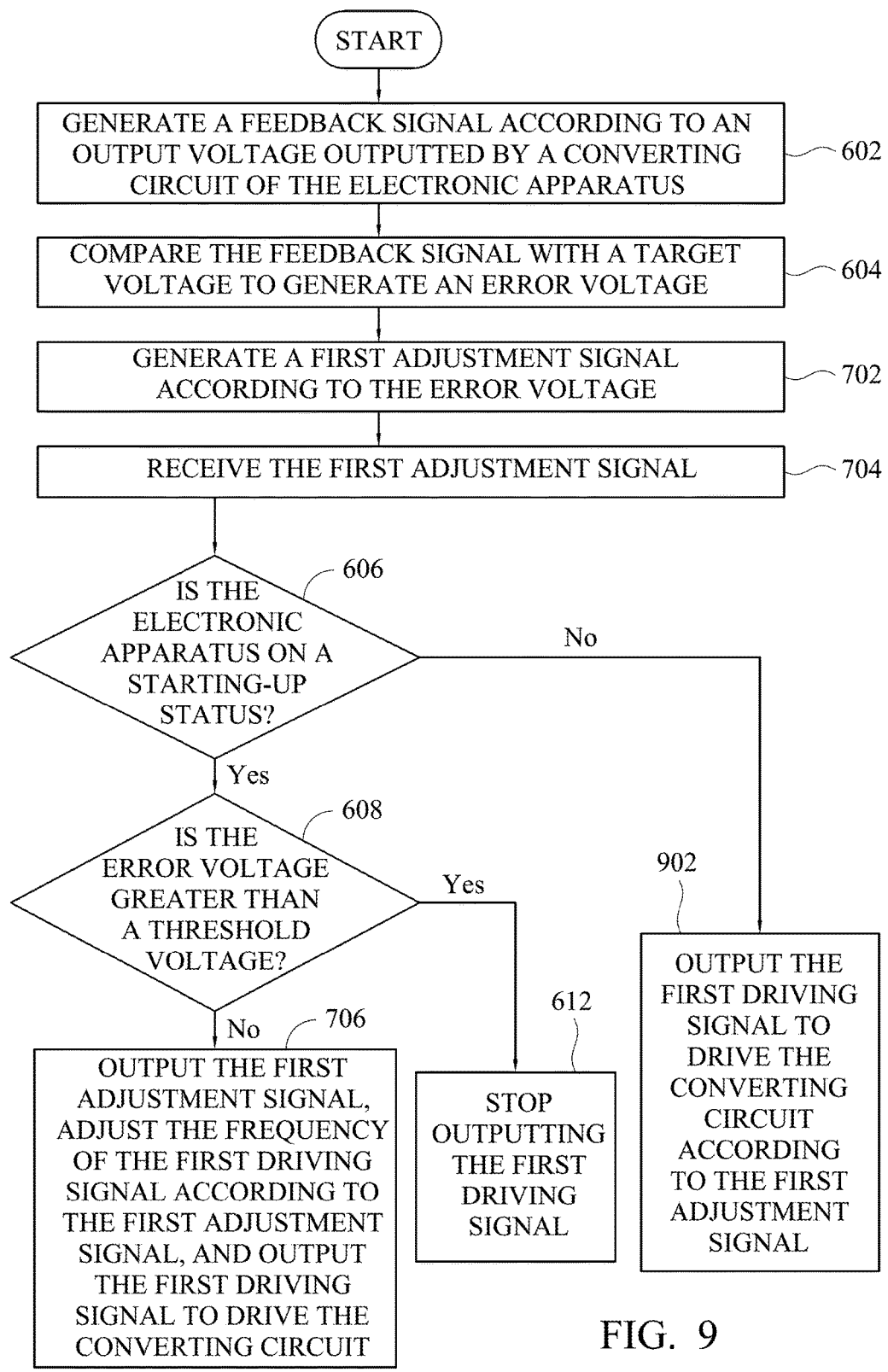
FIG. 9 illustrates a schematic flow chart of a control method of an electronic apparatus in accordance with one embodiment of the disclosure.

Please refer to FIG. 9, FIG. 9 illustrates a schematic flow chart of a control method of an electronic apparatus in accordance with one embodiment of the disclosure. In comparison with the control method of the electronic apparatus shown in FIG. 7, the control method of the electronic apparatus shown in FIG. 9 further includes step 902. The control method of the electronic apparatus may be applied to the electronic apparatus 100a shown in FIG. 2, but is not limited thereto. For convenient and clear illustration, the control method of the electronic apparatus described below is illustrated in conjunction with the electronic apparatus 100a shown in FIG. 2.

At step 902, when the electronic apparatus 100a is on the operating status followed after the starting-up status, the signal generator 240 outputs the first driving signal 125 to drive the converting circuit 110 according to the first adjustment signal 225.

Figure 10:
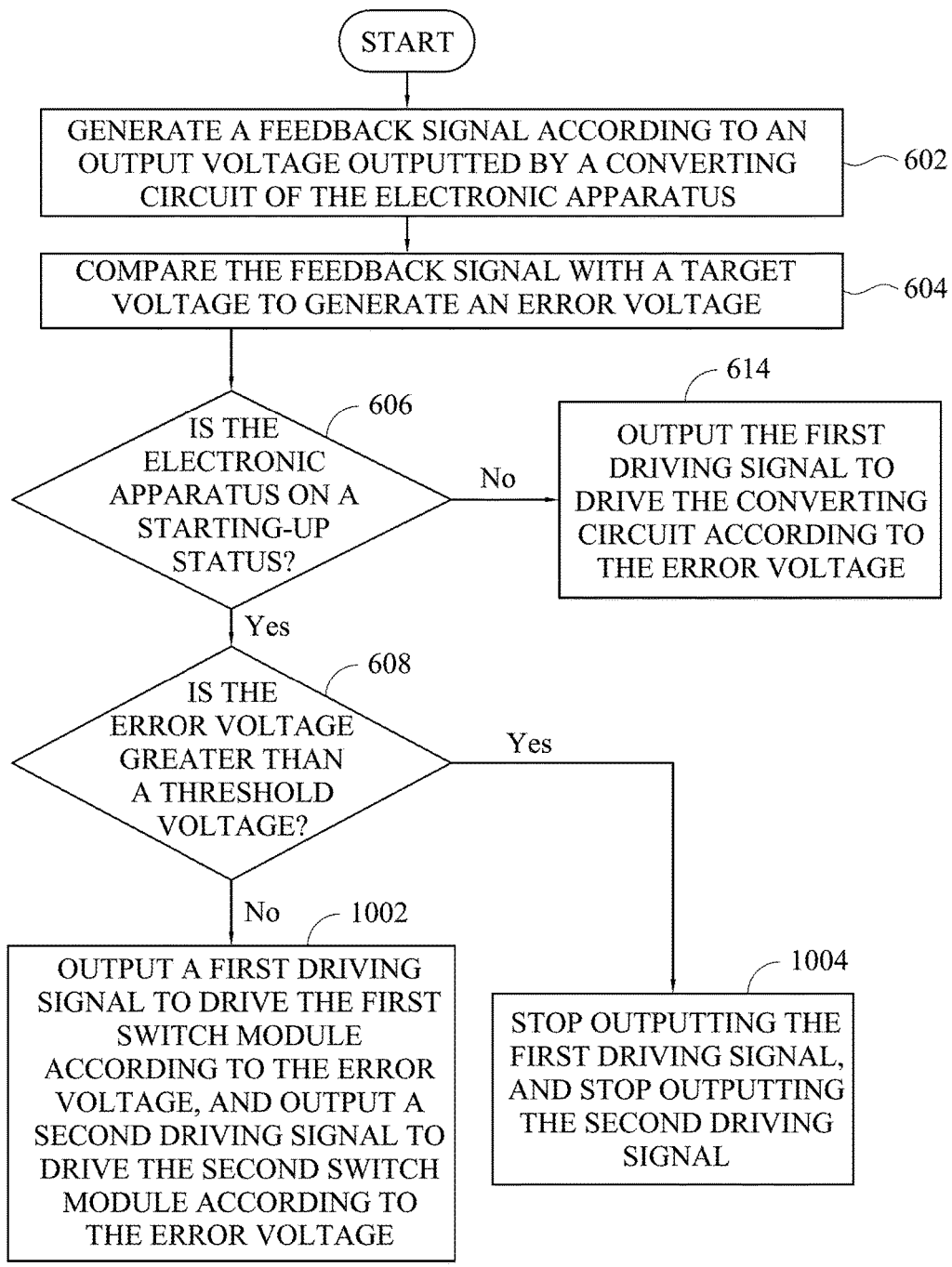
FIG. 10 illustrates a schematic flow chart of a control method of an electronic apparatus in accordance with one embodiment of the disclosure.

Please refer to FIG. 10, FIG. 10 illustrates a schematic flow chart diagram of a control method of an electronic apparatus in accordance with one embodiment of the disclosure. In comparison with the control method of the electronic apparatus shown in FIG. 6, the control method of the electronic apparatus shown in FIG. 10 further includes step 1002 and step 1004. The control method of the electronic apparatus may be applied to the electronic apparatus 100b shown in FIG. 4, but is not limited thereto. For convenient and clear illustration, the control method of the electronic apparatus described below is illustrated in conjunction with the electronic apparatus 100b shown in FIG. 4.

At step 1002, when the electronic apparatus 100b is on the starting-up status and the error voltage is not greater than the threshold voltage, the first control circuit 120 outputs the first driving signal 125 to drive the first switch module 411 according to the error voltage, and outputs the second driving signal 425 to drive the second switch module 412 according to the error voltage. In one embodiment, the frequency of the second driving signal 425 is determined according the error voltage.

When the electronic apparatus 100b is on the starting-up status and the error voltage is greater than the threshold voltage, at step 1004, the first control circuit 120 stops outputting the second driving signal 425.

In one embodiment, the first switch module 411 includes first switching elements S1, S2, S3 and S4. The second switch module 412 includes second switching elements S5 and S6. The first driving signal 125 is used for controlling on/off of the switching elements S1, S2, S3 and S4, and the second driving signal 425 is used for controlling on/off of the second switching elements S5 and S6.

Figure 11:
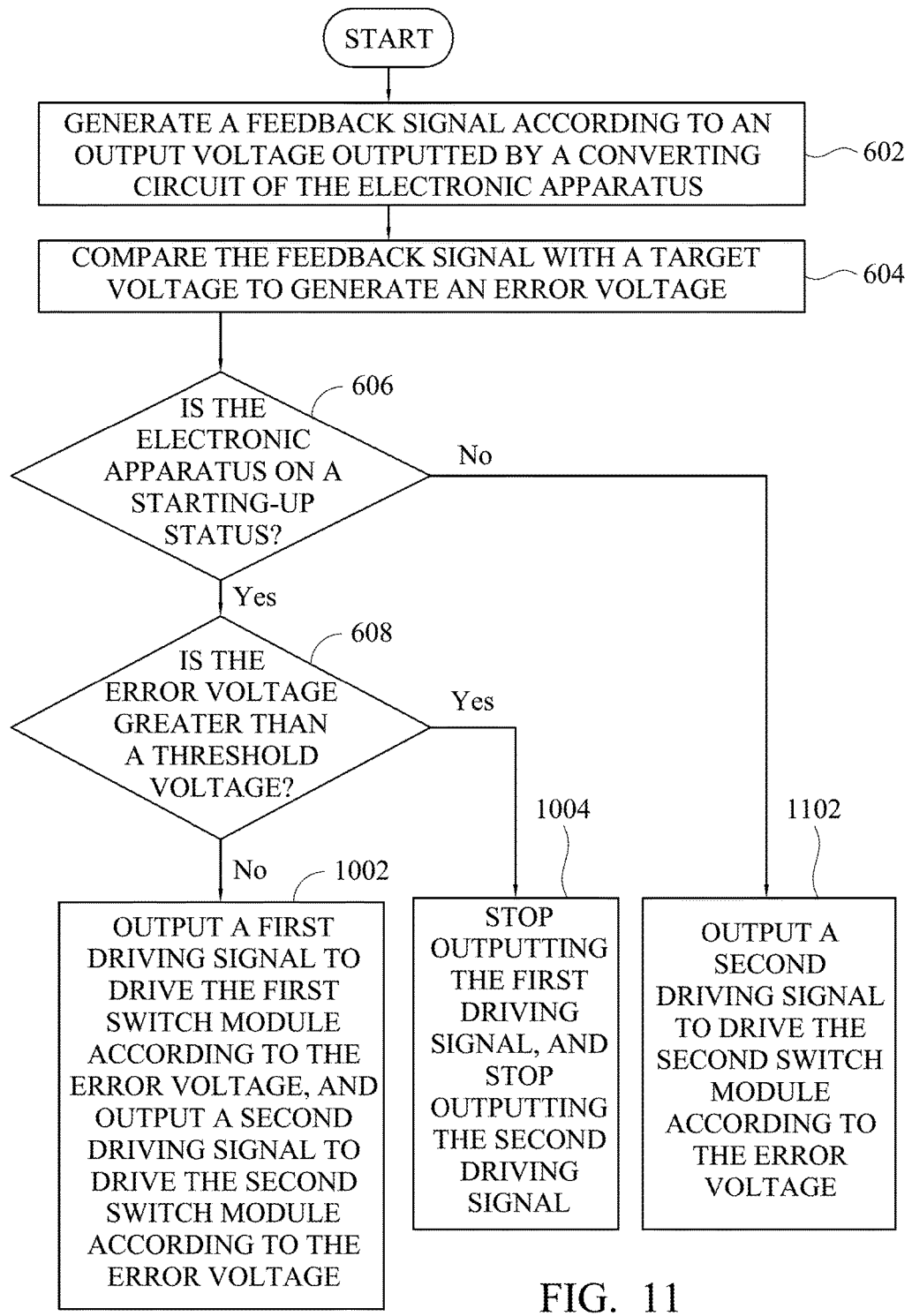
FIG. 11 illustrates a schematic flow chart of a control method of an electronic apparatus in accordance with one embodiment of the disclosure.

Please refer to FIG. 11, FIG. 11 illustrates a schematic flow chart of a control method of an electronic apparatus in accordance with one embodiment of the disclosure. In comparison with the control method of the electronic apparatus shown in FIG. 10, the control method of the electronic apparatus shown in FIG. 11 further includes step 1102. The control method of the electronic apparatus may be applied to the electronic apparatus 100b shown in FIG. 4, but is not limited thereto. For convenient and clear illustration, the control method of the electronic apparatus described below is illustrated in conjunction with the electronic apparatus 100b shown in FIG. 4.

At step 1102, when the electronic apparatus 100b is on the operating status followed after the starting-up status, the first control circuit 120 outputs the second driving signal 425 to drive the second switch module 412 according to the error voltage.

Figure 12:
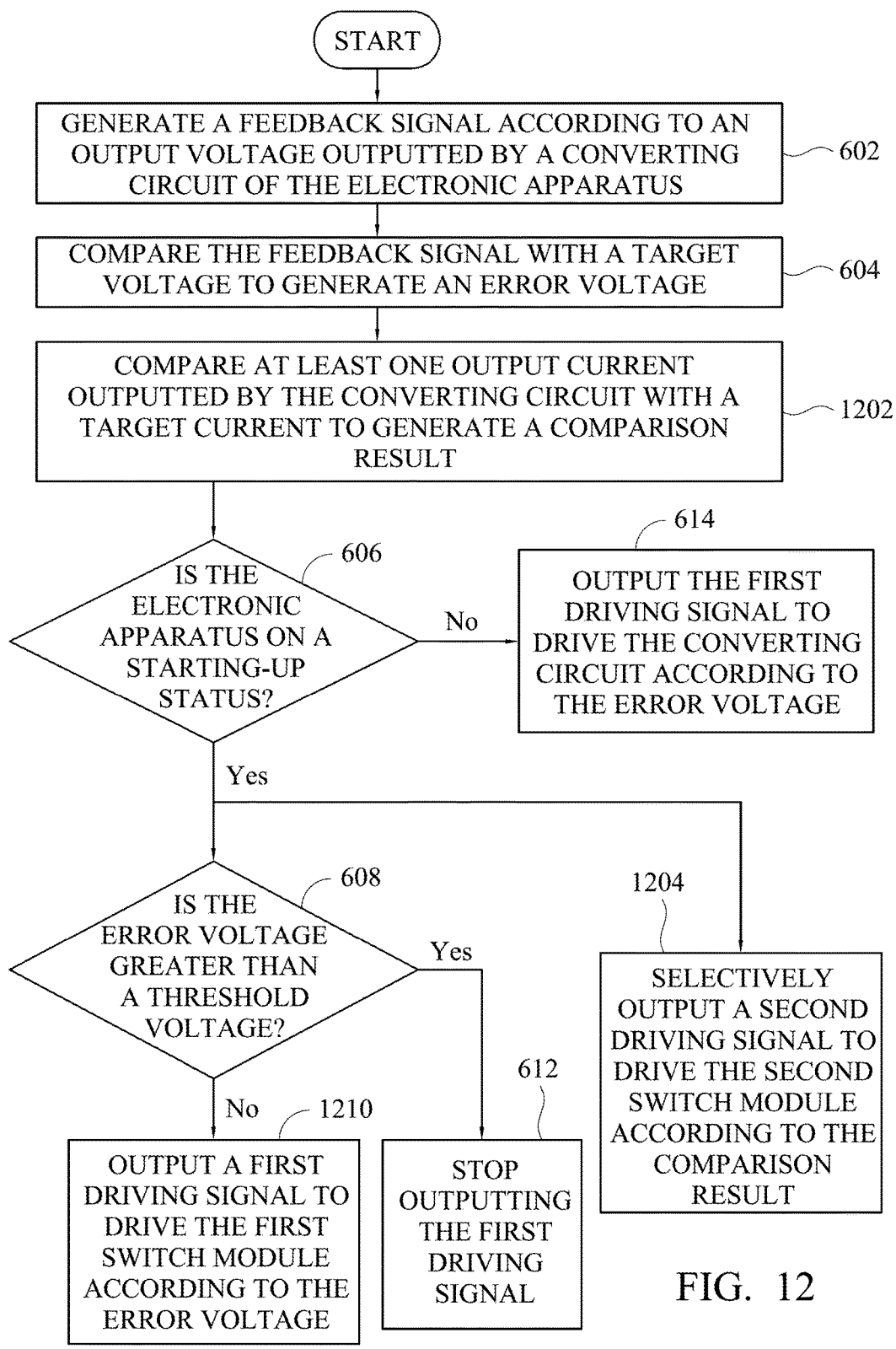
FIG. 12 illustrates a schematic flowchart diagram of a control method of an electronic apparatus in accordance with one embodiment of the disclosure.

Please refer to FIG. 12, FIG. 12 illustrates a schematic flow chart of a control method of an electronic apparatus in accordance with one embodiment of the disclosure. In comparison with the control method of the electronic apparatus shown in FIG. 6, the control method of the electronic apparatus shown in FIG. 12 further includes step 1202, step 1204 and step 1210. The control method of the electronic apparatus may be applied to the electronic apparatus 100c shown in FIG. 5, but is not limited thereto. For convenient and clear illustration, the control method of the electronic apparatus described below is illustrated in conjunction with the electronic apparatus 100c shown in FIG. 5.

At step 1202, the second control circuit 520 compares at least one output current Io outputted by the converting circuit 110 with a target current Iref to generate a comparison result.

When the electronic apparatus 100c is on the starting-up status, in step 1204, the second control circuit 520 selectively outputs a second driving signal 525 to drive the second switch module 412 according to the comparison result.

Further, in comparison with step 610 shown in FIG. 6, at step 1210, the first control circuit 120 outputs the first driving signal 125 to drive the first switch module 411 according to the error voltage.

In one embodiment, the control method further includes step 1102 in the embodiment shown in FIG. 11. Specific embodiment may be referred to the illustration in the embodiment shown in FIG. 11, and is not repeated herein.

It should be noted that, unless the sequence of the steps as shown in the above embodiments is expressly indicated, the sequence of the steps is interchangeable as default, and all or part of the steps may be simultaneously, partially simultaneously, or sequentially performed.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An electronic apparatus, comprising:
   a converting circuit converting an input voltage to an output voltage; and
   a first control circuit electrically connected to the converting circuit, the first control circuit comparing a feedback signal representing the output voltage with a target voltage to generate an error voltage, wherein the target voltage continues to increase from a lower voltage value to a higher constant voltage value during the electronic apparatus is on a starting-up status, wherein the first control circuit outputs a first driving signal to drive the converting circuit according to the error voltage when the electronic apparatus is on the starting-up status and the error voltage is not greater than a threshold voltage, whereas the first control circuit stops outputting the first driving signal when the electronic apparatus is on the starting-up status and the error voltage is greater than the threshold voltage;
   wherein a frequency of the first driving signal is determined according to the error voltage;
   wherein the first control circuit further comprises:
   a voltage compensator outputting a first adjustment signal according to the error voltage;
   a burst controller electrically connected to the voltage compensator, the burst controller receiving the first adjustment signal and outputting the first adjustment signal when the electronic apparatus is on the starting-up status and the error voltage is not greater than the threshold voltage; and
   a signal generator electrically connected to the burst controller, the signal generator receiving the first adjustment signal to output the first driving signal, and to adjust the frequency of the first driving signal when the electronic apparatus is on the starting-up status and the error voltage is not greater than the threshold voltage.

2. The electronic apparatus of claim 1, wherein the first control circuit outputs the first driving signal to drive the converting circuit according to the error voltage when the electronic apparatus is on an operating status followed after the starting-up status.

3. The electronic apparatus of claim 1, wherein the burst controller further outputs a second adjustment signal to the signal generator when the electronic apparatus is on the starting-up status and the error voltage is greater than the threshold voltage, such that the signal generator stops outputting the first driving signal according to the second adjustment signal.

4. The electronic apparatus of claim 1, wherein the signal generator outputs the first driving signal to drive the converting circuit according to the first adjustment signal when the electronic apparatus is on an operating status followed after the starting-up status.

5. The electronic apparatus of claim 1, wherein the converting circuit comprises a transformer, a first switch module disposed at a first side of the transformer and a second switch module disposed at a second side of the transformer, wherein the first driving signal is used to drive the first switch module, and the first control circuit further outputs a second driving signal to drive the second switch module according to the error voltage when the electronic apparatus is on the starting-up status and the error voltage is not greater than the threshold voltage, whereas the first control circuit stops outputting the first driving signal and the second driving signal when the electronic apparatus is on the starting-up status and the error voltage is greater than the threshold voltage;
   wherein a frequency of the second driving signal is determined according to the error voltage.

6. The electronic apparatus of claim 5, wherein the first control circuit further outputs the second driving signal to drive the second switch module according to the error voltage when the electronic apparatus is on an operating status followed after the starting-up status.

7. The electronic apparatus of claim 1, wherein the converting circuit comprises a transformer, a first switch module disposed at a first side of the transformer and a second switch module disposed at a second side of the transformer, wherein the first driving signal is used for driving the first switch module, the electronic apparatus further comprising:
   a second control circuit electrically connected to the converting circuit, the second control circuit comparing at least one output current outputted by the converting circuit with a target current to generate a comparison result for selectively outputting a second driving signal to drive the second switch module according to the comparison result when the electronic apparatus is on the starting-up status.

8. The electronic apparatus of claim 1, wherein the first control circuit further comprises:
   an operation unit configured to subtract the target voltage from the feedback signal to generate the error voltage.

9. The electronic apparatus of claim 1, wherein the first control circuit is further configured to determine that the electronic apparatus enter the starting-up status according to a starting-up enable signal, and to determine that the electronic apparatus exits the starting-up status when the difference between the feedback signal and a constant voltage is smaller than a numerical value.

10. The electronic apparatus of claim 1, wherein the converting circuit is a resonant converting circuit.

11. A control method of an electronic apparatus, comprising:
    generating a feedback signal according to an output voltage outputted by a converting circuit of the electronic apparatus;
    comparing the feedback signal with a target voltage to generate an error voltage, wherein the target voltage continues to increase from a lower voltage value to a higher constant voltage value during the electronic apparatus is on a starting-up status;

outputting a first driving signal to drive the converting circuit according to the error voltage when the electronic apparatus is on the starting-up status and the error voltage is not greater than a threshold voltage;

wherein outputting the first driving signal to drive the converting circuit according to the error voltage comprises:

generating a first adjustment signal according to the error voltage;

outputting the first driving signal to drive the converting circuit, and adjusting the frequency of the first driving signal according to the first adjustment signal when the electronic apparatus is on the starting-up status and the error voltage is not greater than the threshold voltage; and stopping outputting the first driving signal when the electronic apparatus is on the starting-up status and the error voltage is greater than the threshold voltage;

wherein a frequency of the first driving signal is determined according to the error voltage.

12. The control method of claim 11, further comprising:
outputting the first driving signal to drive the converting circuit according to the error voltage when the electronic apparatus is on an operating status followed after the starting-up status.

13. The control method of claim 11, further comprising:
generating a second adjustment signal when the electronic apparatus is on the starting-up status and the error voltage is greater than the threshold voltage; and
stopping outputting the first driving signal according to the second adjustment signal.

14. The control method of claim 11, further comprising:
outputting the first driving signal to drive the converting circuit according to the first adjustment signal when the electronic apparatus is on an operating status followed after the starting-up status.

15. The control method of claim 11, wherein the converting circuit comprises a transformer, a first switch module disposed at a first side of the transformer and a second switch module disposed at a second side of the transformer, wherein the first driving signal is used for driving the first switch module, the control method further comprising:

outputting a second driving signal to drive the second switch module according to the error voltage when the electronic apparatus is on the starting-up status and the error voltage is not greater than the threshold voltage; and stopping outputting the second driving signal when the electronic apparatus is on the starting-up status and the error voltage is greater than the threshold voltage;

wherein a frequency of the second driving signal is determined according to the error voltage.

16. The control method of claim 15, further comprising:
outputting the second driving signal to drive the second switch module of the transformer according to the error voltage when the electronic apparatus is on an operating status followed after the starting-up status.

17. The control method of claim 11, wherein the converting circuit comprises a transformer, a first switch module disposed at a first side of the transformer and a second switch module disposed at a second side of the transformer, wherein the first driving signal is used for driving the first switch module, the control method further comprising:

comparing at least one output current outputted by the converting circuit with a target current to generate a comparison result, and selectively outputting a second driving signal to drive the second switch module according to the comparison result when the electronic apparatus is on the starting-up status.

18. The control method of claim 11, further comprising:
determining that the electronic apparatus enters the starting-up status according to a starting-up enable signal; and
determining that the electronic apparatus exits the starting-up status when the difference between the feedback signal and a constant voltage is smaller than a numerical value.

* * * * *